E. H. COOK.
Fertilizer.

No. 85,284.  Patented Dec. 29, 1868.

Witnesses:
Otto L. Johnson.
A. E. Robinson

Inventor:
Elisha H. Cook

ELISHA H. COOK, OF CLARENDON, MICHIGAN.

Letters Patent No. 85,284, dated December 29, 1868.

IMPROVEMENT IN SEED AND FERTILIZER-SOWERS.

The Schedule referred to in these Letters Patent and making part of the same.

*To all whom it may concern:*

Be it known that I, ELISHA H. COOK, of Clarendon, in the county of Calhoun, and State of Michigan, have invented certain new and useful Improvements in Machines for Sowing Seed and Fertilizers; and I do hereby declare that the following is a full, clear, and exact description of the construction and operation of the same, reference being had to the annexed drawings, making a part of this specification, in which—

Figure 1:
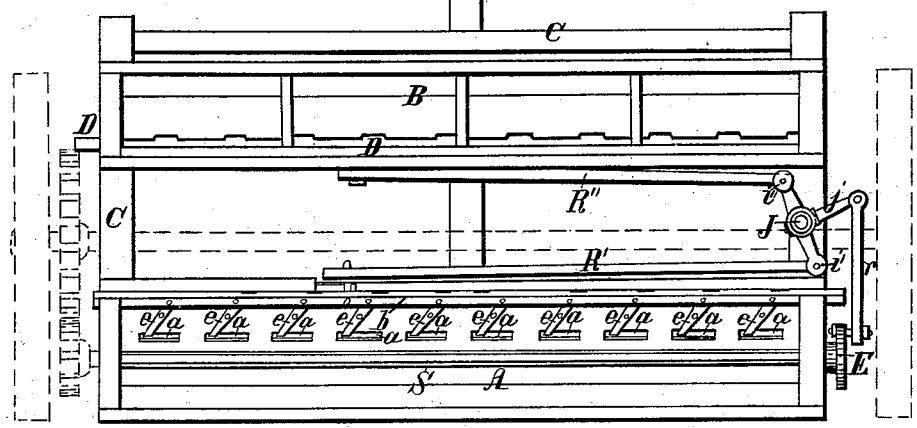

Figure 1 exhibits a plane or top view of the hopper and connections, the covers being removed.

Figure 2:
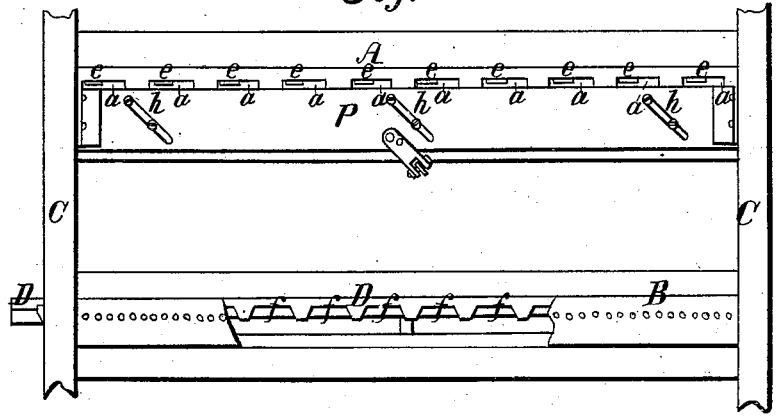

Figure 2 is a plane view of under sides of same.

Similar letters of reference indicate corresponding parts in both figures.

My invention relates more especially to that class of seeding-machines in which clover-seed and plaster are sown from separate, fixed hoppers, and consists of improvements in the feeding and gauging-devices thereof, and mode of arranging and operating the same.

The better to enable others to construct and use said improvements, I will proceed to describe them.

A represents a long hopper, with flaring sides, to contain plaster or other fertilizing-substance, and B exhibits also the interior of a similarly-formed hopper, to contain seed, both hoppers being secured on a suitable frame, indicated at C, which frame is mounted on traction-wheels, (as seen in dotted lines,) the arrangement being similar to that in common use, excepting in this, that my mode of operating the feeding-devices requires the two hoppers to be a little distance apart, as will hereinafter more fully appear.

*a a a*, &c., represent slotted openings, which I cut longitudinally through the bottom of the hopper A, close to its inner side, for the discharge of the plaster, and to this inner side I pivot, at or about their centre, the vibrating-fingers *e*, as seen, the lower ends of which pass down through the slots *a*, and past a sliding-gauge plate underneath, (to be presently described,) and the upper ends of said fingers, which reach to the top of the hopper, are pivoted to a bar, *b*, having a sliding-motion horizontally, back and forth, in bearings in the hopper-ends.

I enlarge or contract the discharge-openings *a*, and so regulate the quantity of plaster to be sown by the means of a gauge-plate, P, held up by screw-heads and end-flanges, close against the under side of the hopper-bottom, said screws passing through angular slots *h*, so as to secure a parallel movement, and enable the driver to adjust it by a lever, applied at some point nearly central.

The bottom of the seed-hopper B is pierced with a range of small holes for the delivery of the seed, which holes, are traversed back and forth by a notched feed-bar, D, guided partly by an upper strip, fastened to the hopper-side, and within bearing gains or slots, cut through the hopper-ends.

The only substantial difference between this and the usual mode of feeding small grass or clover-seed is in this, viz, that I make the sides of the standing-wood of the bar, resting on the hopper-bottom, angular instead of square, as in the common way.

The advantage derived from thus making the feed-notches in the bar flaring, as seen at *f*, in fig. 2, (where a portion of the hopper-bottom is shown as broken away,) is to force back the seed, and prevent the crowding and jamming within the notch-spaces, which, in the ordinary construction, so often causes interrupted and uneven delivery.

To graduate the quantity of seed sown, I employ the usual perforated gauge-plate, not seen, and provide, in addition, for altering the length of the feed-bar's travel.

S represents a shaft, which is hung longitudinally inside the plaster-hopper. This shaft carries an overhanging pinion, driven at a proper speed from the main axle of the machine, as shown by dotted lines, in the usual way.

The shaft S is designed to be fitted with any of the well-known appliances for keeping the plaster in a pulverized condition and feeding it towards the discharge-slots, and is also provided with a crank, E, which gives motion to the vibrating feed-fingers and notched feed-bar in the following manner:

About midway at the crank-end of the frame, between the two hoppers, I erect a vertical rocking-shaft, J, by stepping the lower end in the frame, and hanging the upper end to a bar (not seen) connected to top of one or both of the hoppers.

The shaft J carries three horizontal arms, two of them, *i'* and *i''*, being fixed immovably in the shaft, and the other, at *j*, is so inserted that it shall be free to turn like a journal in its bearing.

The arm *i'* is jointed to the rod R', connecting with the sliding bar *v*, and the arm *i''* is jointed to the rod R'', which operates the notched bar in the seed-hopper.

The journal-arm *j* is jointed to the end of the crank-connecting rod *r*, and by this combined arrangement both vertical and horizontal vibration in the connecting-joints are fully provided for, and a reciprocating rectilinear motion is communicated to the angular notched feed-bar D and finger-bar *b*, which sets in motion the vibrating fingers *e*; and in this manner, when, by the outward motion of the machine, the shaft E is revolved, as previously described, the seed and plaster are evenly sown, in regulated quantities, through their respective discharge-orifices, upon the prepared ground.

I am aware that vibrating fingers have long been in use for various purposes, and I do not claim operating them, even within the discharge-orifices of a plaster-hopper, irrespective of their relative arrangement with said hopper; but I am not aware that vibrating fingers, the points of which extend downward through the discharging-slots, have ever before been arranged inside the hopper, as in mine, whereby they serve as agitators, are more readily operated, and do not intercept or obstruct the falling plaster.

I also disclaim broadly notched feed-bars, traversing a range of holes for sowing small seeds; but I deem it new, and of great advantage, as hereinbefore explained, to make them angular, as shown, within the notch-spaces.

Having thus described my invention, What I claim as new, and desire to secure by Letters Patent, is the following:

1. The flaring notches $f$ in the reciprocating feed-bar D, in combination with the seed-hopper B, having a perforated bottom, substantially as and for the use specified.

2. The mode of operating the reciprocating or vibrating feed-devices of a plaster and seed-hopper, by the arrangement and combination therewith of the three-armed rocking-shaft J, connecting-rods $r$, $R'$ $R''$, and driving-crank E, substantially in the manner as set forth.

ELISHA H. COOK.

Witnesses:
OTTO L. JOHNSON,
A. E. ROBINSON.